US008008796B2

(12) United States Patent
Muchow (10) Patent No.: US 8,008,796 B2
(45) Date of Patent: Aug. 30, 2011

(54) POWER GENERATION SYSTEM

(75) Inventor: David J. Muchow, Arlington, VA (US)

(73) Assignee: Global Power Enterprises, LLC, Arlington, VA (US)

( * ) Notice: Subject to any disclaimer, the term of this patent is extended or adjusted under 35 U.S.C. 154(b) by 0 days.

(21) Appl. No.: 12/458,448

(22) Filed: Jul. 13, 2009

(65) Prior Publication Data

US 2010/0259044 A1 Oct. 14, 2010

(51) Int. Cl.
*F03B 13/00* (2006.01)
*H02P 9/04* (2006.01)
(52) U.S. Cl. .................................. 290/54; 290/43
(58) Field of Classification Search .................. 290/53, 290/54, 43, 52, 4 R; 60/398; 417/148
See application file for complete search history.

(56) References Cited

U.S. PATENT DOCUMENTS

| | | | | |
|---|---|---|---|---|
| 1,247,520 A | | 11/1917 | Fessenden | |
| 3,484,617 A | * | 12/1969 | Winsel | 290/44 |
| 3,939,356 A | * | 2/1976 | Loane | 290/52 |
| 4,206,608 A | * | 6/1980 | Bell | 60/698 |
| 4,229,661 A | * | 10/1980 | Mead et al. | 290/44 |
| 4,284,899 A | | 8/1981 | Bendiks | |
| 4,443,707 A | | 4/1984 | Scieri et al. | |
| 4,514,977 A | * | 5/1985 | Bowen | 60/398 |
| 4,739,182 A | * | 4/1988 | Kenderi | 290/54 |
| 6,023,105 A | | 2/2000 | Youssef | |
| 6,051,892 A | * | 4/2000 | Toal, Sr. | 290/43 |
| 6,359,347 B1 | | 3/2002 | Wolf | |
| 6,420,794 B1 | | 7/2002 | Cao | |
| 6,718,761 B2 | * | 4/2004 | Merswolke et al. | 60/398 |
| 6,861,766 B2 | * | 3/2005 | Rembert | 290/43 |
| 7,003,955 B2 | | 2/2006 | Davis | |
| 7,584,610 B2 | * | 9/2009 | Ziegenfuss | 60/398 |
| 2004/0088971 A1 | | 5/2004 | Mishnayot | |
| 2008/0191484 A1 | * | 8/2008 | Okubo et al. | 290/44 |
| 2009/0008940 A1 | * | 1/2009 | Strain | 290/52 |
| 2010/0072818 A1 | * | 3/2010 | Kelly | 307/68 |

* cited by examiner

*Primary Examiner* — Julio Gonzalez
(74) *Attorney, Agent, or Firm* — Finnegan, Henderson, Farabow, Garrett & Dunner, LLP (57) ABSTRACT

A water tower includes a reservoir configured to store fluid. The reservoir includes a bottom surface. The water tower also includes a recirculating passageway fluidly connected to the reservoir. The recirculating passageway includes a first end connected to and located near or below the bottom surface of the reservoir, and a second end connected to the reservoir above the bottom surface of the reservoir. The water tower further includes a pump located in the recirculating passageway and configured to pump fluid through the recirculating passageway, and a fluid-driven energy generating device fluidly connected to the recirculating passageway. At least a portion of fluid directed through the energy generating device is directed through the recirculating passageway.

20 Claims, 3 Drawing Sheets

100
POWER GENERATION SYSTEM

TECHNICAL FIELD

The present disclosure relates generally to a power generation system, and more particularly, to a power generation system including a reservoir for storing fluid.

BACKGROUND

Municipal and other types of water towers may include pumps for pumping water into the water towers, but using electricity to pump water into the water towers requires substantial expense. At night, when the demand for water typically is less, the rates for purchasing power from the electric power grid frequently are off-peak and lower. Therefore, pumping water into the water towers during off-peak times may reduce the cost of running the pumps. However, pumping water into the water towers still requires substantial expense, and for some water towers, it is often unavoidable to pump water into the water towers during peak times. The disclosed power generation system is directed to overcoming one or more of the problems of the existing technology, as will be described below.

SUMMARY

In one aspect, the present disclosure is directed to a water tower including a reservoir configured to store fluid. The reservoir includes a bottom surface. The water tower also includes a recirculating passageway fluidly connected to the reservoir. The recirculating passageway includes a first end connected to and located near or below the bottom surface of the reservoir, and a second end connected to the reservoir above the bottom surface of the reservoir. The water tower further includes a pump located in the recirculating passageway and configured to pump fluid through the recirculating passageway, and a fluid-driven energy generating device fluidly connected to the recirculating passageway. At least a portion of fluid directed through the energy generating device is directed through the recirculating passageway.

In another aspect, the present disclosure is directed to a method of operating a power generation system. The method includes storing fluid in a reservoir in the power generation system, pumping at least a portion of fluid discharged from the reservoir back into the reservoir through a recirculating passageway in the power generation system, and supplying power for pumping the discharged fluid using a plurality of power sources. The power sources include a fluid-driven energy generating device located in the power generation system. The method further includes using a control system to determine which of the power sources to supply power for pumping the discharged fluid.

In a further aspect, the present disclosure is directed to a power generation system including a reservoir configured to store fluid. The reservoir includes a bottom surface. The power generation system also includes a recirculating passageway fluidly connected to the reservoir. The recirculating passageway includes a first end located near or below the bottom surface of the reservoir and a second end connected to the reservoir above the bottom surface of the reservoir. The power generation system further includes a fluid-driven energy generating device fluidly connected to the recirculating passageway, a pump located in the recirculating passageway, and an arm inside the reservoir and fluidly connected to the recirculating passageway. At least a portion of fluid directed through the energy generating device is directed through the recirculating passageway. The arm includes a discharge valve through which fluid is capable of being supplied to the reservoir.

In yet another aspect, the present disclosure is directed to a power generation system including a reservoir configured to store fluid. The reservoir includes an outlet through which fluid is discharged from the reservoir and an inlet through which fluid is supplied to the reservoir. The power generation system further includes a recirculating passageway fluidly connecting the outlet of the reservoir to the inlet of the reservoir, a compressed fluid passageway fluidly connected to a compressor and configured to direct compressed fluid from the compressor into the reservoir, and a fluid-driven energy generating device located in at least one of the recirculating passageway, the compressed fluid passageway, or a passageway connected to the outlet of the reservoir.

In yet a further aspect, the present disclosure is directed to a water tower. The water tower includes a reservoir configured to store fluid and a recirculating passageway fluidly connected to the reservoir. The recirculating passageway includes a first end configured to receive fluid from the reservoir and a second end configured to supply fluid to the reservoir. The second end of the recirculating passageway is connected to the reservoir above a liquid surface in the reservoir. The water tower also includes a pump located in the recirculating passageway and configured to pump fluid through the recirculating passageway, and a fluid treatment device located in the recirculating passageway.

In a further aspect, a power generation system includes a control system, a plurality of reservoirs connected to the control system and an electric grid, and a recirculating passageway fluidly connected to at least one of the reservoirs. The recirculating passageway includes a first end configured to receive fluid from the at least one reservoir and a second end configured to supply fluid to the at least one reservoir. The second end of the recirculating passageway is connected to the at least one reservoir above a liquid surface in the at least one reservoir. The power generation system includes a pump located in the recirculating passageway and configured to pump fluid through the recirculating passageway, and a plurality of sensors configured to monitor power and fluid conditions in each reservoir. The control system is connected to the sensors and controls power and fluid conditions in each reservoir.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
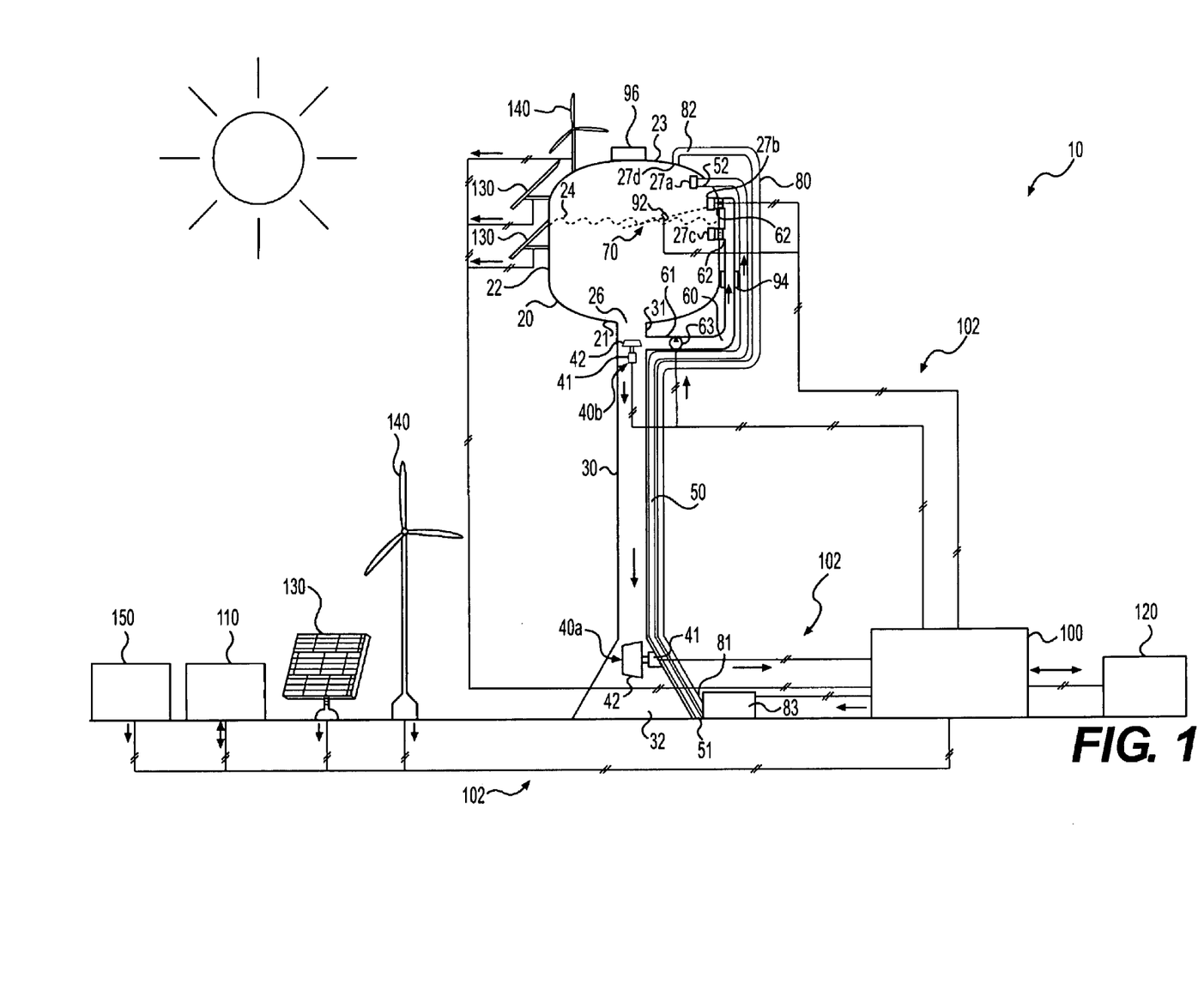
FIG. 1 is a perspective view of an exemplary disclosed water tower with a power storage and generation system.
Figure 2:
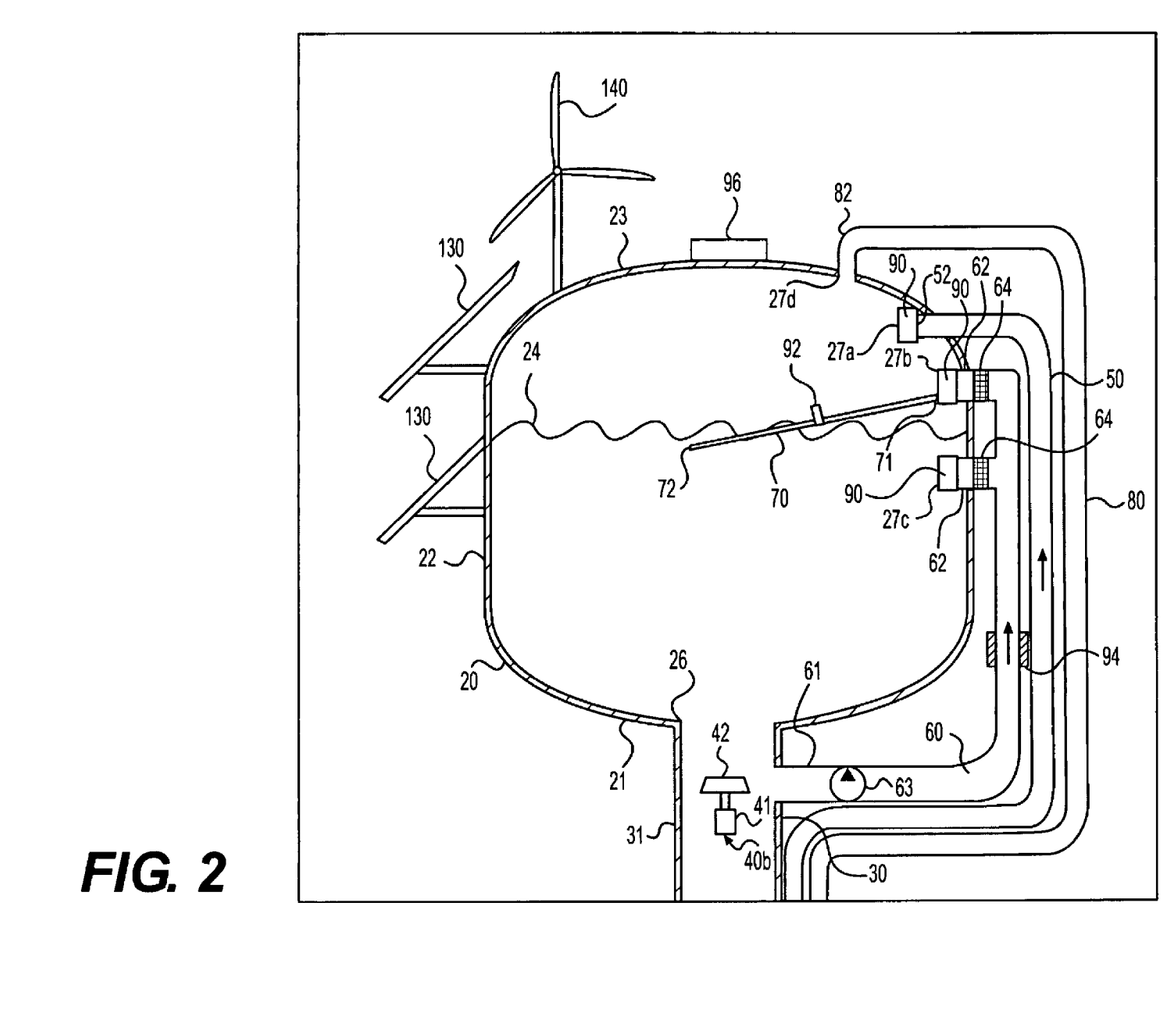
FIG. 2 is a sectional view of a reservoir of the water tower of FIG. 1.

FIGS. 1 and 2 show a power generation system 10, according to an exemplary embodiment. The power generation system 10 may be integrated into the structure of a water tower, such as a water tower used in a municipal water system. Alternatively, the power generation system 10 may be integrated into another type of structure, such as a commercial, industrial, or residential building, or other type of structure capable of including the components of the power generation system 10 described below.

The power generation system 10 includes an elevated reservoir 20, housing, or other structure capable of storing fluid. The reservoir 20 may include a bottom surface 21, a side surface 22, and a top surface 23. Fluid stored in the reservoir 20 may include a mixture of liquid and gas so that the liquid forms a liquid surface 24 separating liquid from gas. In the exemplary embodiments described below in connection with FIGS. 1 and 2, the fluid in the reservoir 20 is water and air. However, it is to be understood that the power generation system 10 may contain other fluids that form a mixture of liquid and gas. Alternatively, the fluid in the power generation system 10 may be gaseous only (without any liquid), or may be substantially gaseous.

The reservoir 20 may be similar to a reservoir included in conventional water towers. For example, the reservoir 20 may be attached to one or more support legs and/or other types of structures (e.g., a building) to support the reservoir 20 so that the reservoir 20 is raised to a desired elevation. The desired elevation of the reservoir 20 may be determined based on a desired fluid pressure in the power generation system 10 and/or other factors. The water tower may be constructed using a variety of materials, such as steel, reinforced or pre-stressed concrete, fiberglass, brick, etc. The reservoir 20 may be formed in a variety of shapes, such as spherical, cylindrical, ellipsoidal, boxlike, etc.

The size of the reservoir 20 may vary depending on its intended use, e.g., the size of the community to which the water tower is intended to supply water, as is typical for conventional water towers. The reservoir 20 may be small enough to supply water for only a building or for smaller use, or the reservoir 20 may be large enough to supply water to a city. For example, the capacity of the reservoir may range from 5,000 gallons (or less) to 1 million gallons (or more). Other factors may also determine the size of the reservoir 20, e.g., minimum/maximum power generation requirements.

The power generation system 10 includes passageways formed by pipes or other types of conduits connected directly or indirectly to the reservoir 20. For example, the power generation system 10 may include one or more of a discharge passageway 30, a refilling passageway 50, a recirculating passageway 60, and a compressed air passageway 80. These passageways 30, 50, 60, 80 may connect directly or indirectly to one or more outlets 26 in the reservoir 20, and/or one or more inlets 27a, 27b, 27c, 27d in the reservoir 20. Fluid may be discharged from the reservoir 20 through the outlet 26, and supplied to the reservoir 20 through the inlets 27a, 27b, 27c, 27d. The exemplary embodiment shown in FIGS. 1 and 2 includes one outlet 26 and four inlets 27a, 27b, 27c, 27d. However, the power generation system 10 is not limited to these numbers of outlets and inlets. For example, as an alternative, several of the passageways that supply fluid to the reservoir 20 may converge into a single passageway that connects to a single inlet in the reservoir 20.

The discharge passageway 30 may connect to the outlet 26 of the reservoir 20 to discharge water from the reservoir 20, and may include a first end 31 and a second end 32 that is lower than the first end 31. For example, the first end 31 of the discharge passageway 30 may connect to the outlet 26 in a lower portion of the reservoir 20, e.g., the bottom surface 21 of the reservoir 20 or a lower portion of the side surface 22 of the reservoir 20. The discharge passageway 30 may extend vertically toward the ground so that water discharged from the reservoir 20 may flow downward through the discharge passageway 30. For example, the discharge passageway 30 may form a generally right angle to the ground or may be slanted at a downward angle toward the ground. The second end 32 of the discharge passageway 30 may be above or below ground. At the second end 32 of the discharge passageway 30, the discharged water may be, e.g., stored, transported (e.g., using conduits that are below- or above-ground) to another location for other uses, etc. The power generation system 10 may be controlled based on pressure demands. For example, the power generation system 10 may be controlled to maintain a sufficient pressure of fluid exiting from the second end 32 of the discharge passageway 30 to satisfy pressure demands.

The power generation system 10 may include one or more energy generating devices 40a, 40b. For example, an energy generating device 40a may be connected to the discharge passageway 30 (e.g., at the first end 31, the second end 32, or other location along the length of the discharge passageway 30, such as the intermediate location shown in FIGS. 1 and 2), and an energy generating device 40b may be connected to or upstream from the recirculating passageway 60 (e.g., at the inlets 27b, 27c, a first end 61, or a second end 62; in other locations along the length of the recirculating passageway 60; in the discharge passageway 30 upstream from the recirculating passageway 60; etc.). As shown in FIGS. 1 and 2, the energy generating device 40b associated with the recirculating passageway 60 may be located underneath the bottom surface 21 of the reservoir 20 and where the discharge passageway 30 and the recirculating passageway 60 converge.

The energy generating devices 40a, 40b may be configured to generate mechanical and/or electrical energy. According to an embodiment, each of the energy generating devices 40a, 40b may include a generator 41, such as a hydroelectric or other fluid-driven generator. Each of the generators 41 may be connected to a respective turbine 42 positioned in the discharge passageway 30 and/or the recirculating passageway 60. The turbines 42 may receive water discharged from the reservoir 20 and may transform energy from the flowing water to mechanical (e.g., rotational) energy. For example, at least a portion of the discharged water may flow downward from the reservoir 20 to the discharge passageway 30 and the recirculating passageway 60. The flow of water received in the turbines 42 in the discharge passageway 30 and the recirculating passageway 60 may rotate and drive the turbines 42. Accordingly, energy extracted from the flow of the discharged water is transformed into mechanical work, e.g., rotation of the turbines 42. The generators 41 are connected to the respective turbines 42 to allow the mechanical energy produced by the turbines 42 to be transferred to the generators 41, which converts the mechanical energy to electrical energy. Accordingly, the generators 41 and the turbines 42 may be used to produce mechanical and/or electrical power. In addition, water in the power generation system 10 may be used to generate power using a fuel cell (not shown). For example, power from renewable energy or other power sources may be used to generate hydrogen using electrolysis, which separates hydrogen from the water, and the hydrogen could be used to power a fuel cell that generates electricity.

The refilling passageway 50 may connect to the inlet 27a of the reservoir 20 to supply water to the reservoir 20 and refill the reservoir 20. The refilling passageway 50 may include a first end 51 that receives water from an outside source (not shown) above- or below-ground, and a second end 52 that connects to the inlet 27a of the reservoir 20. The refilling passageway 50 may also be connected to a pump (not shown) to pump water back into the reservoir 20 as needed. The pump may be connected by electrical connecting lines to a control system 100 so that the control system 100 may control when and for how long to operate the pump.

The recirculating passageway 60 may recirculate water discharged from the outlet 26 of the reservoir 20 to one or more inlets 27b, 27c of the reservoir 20. For example, the recirculating passageway 60 may include a first end 61 connected to the outlet 26 of the reservoir 20, e.g., via the discharge passageway 51 as shown in FIG. 1 or directly to the outlet 26 of the reservoir 20, and one or more second ends 62 connected to the inlets 27b, 27c of the reservoir 20. The exemplary embodiment shown in FIGS. 1 and 2 includes two inlets 27b, 27c connected to two second ends 62 of the recirculating passageway 60. The inlet 27b may be located below the liquid surface 24, and the inlet 27c may be located above the liquid surface 24. As a result, water may refill the reservoir 20 through the inlet 27b or the inlet 27c, depending on a determination of which would be more efficient, as described below.

The power generation system 10 is not limited to including two inlets 27b, 27c and second ends 62. For example, as an alternative, the recirculating passageway 60 may include a single second end 62 connected to the inlet 27b (or 27c). As yet another alternative, more than two inlets may be provided at regular, spaced intervals vertically on the side surface 22 of the reservoir 20 and may connect to a corresponding number of second ends 62 of the recirculating passageway 60.

The power generation system 10 may include multiple recirculating passageways 60, e.g., connecting one or more outlets of the reservoir 20 (e.g., outlet 26) to one or more inlets of the reservoir 20 (e.g., inlets 27b, 27c). The multiple recirculating passageways 60 may be provided at spaced intervals around the outer surface of the reservoir 20 (e.g., around a circumference of the reservoir 20). For example, the recirculating passageways 60 may connect to a plurality of outlets on the bottom surface 21 of the reservoir 20 and may extend upward at spaced intervals toward a plurality of inlets around the reservoir 20. Alternatively, the recirculating passageways 60 may connect to a single outlet in the reservoir 20 (e.g., outlet 26) and branch out toward a plurality of inlets at spaced intervals around the reservoir 20.

The power generation system 10 may include one or more pumps 63 connected to the recirculating passageway 60. For example, the pump 63 may be located downstream from the energy generating device 40b associated with the recirculating passageway 60, as shown in FIGS. 1 and 2. The pump 63 may be any type of pump commonly used to move a fluid. The pump 63 may include, for example, a constant or variable speed pump or any other suitable pump that may be adapted to circulate a fluid. A bypass line (not shown) including a bypass valve (not shown) may be provided to allow fluid in the recirculating passageway 60 to bypass the pump 63, and the control system 100 may be connected to the bypass valve to control the flow of fluid in the recirculating passageway 60 bypassing the pump 63. The bypass line may offer less resistance to flow for fluid recirculating through the recirculating passageway 60 than the pump 63.

As will be described below, the pump 63 may be connected to the energy generating devices 40a, 40b so that the energy generating devices 40a, 40b may supply the pump 63 with the power used to pump the fluid through the recirculating passageway 60 and recirculate the water back into the reservoir 20. For example, the pump 63 may be driven electrically using the electrical power generated by the generators 41 of the energy generating devices 40a, 40b and/or the pump 63 may be driven mechanically using the mechanical power generated by the turbines 42 of the energy generating devices 40a, 40b. Alternatively, the pump 63 may be driven electrically and/or mechanically using one or more of the other power sources described below and included in the power generation system 10, such as a battery or other power storage system 110; an electric grid 120; a solar array 130, a wind turbine 140, or other renewable energy power source; a fuel-based generator 150; etc. Furthermore, multiple pumps 63 may be provided at various locations along the recirculating passageway 60.

Water may be circulated continuously (or for extended periods of time) through the energy generating device 40b, the recirculating passageway 60, and the reservoir 20 in order to require less power from external power sources, such as the electric grid 120. Motive force for circulating water back to the reservoir 20 may be provided by the force of gravity on water stored in the reservoir 20, which may drive water downward through the recirculating passageway 60. Momentum of the flowing water (particularly if the water is continuously circulating through the recirculating passageway 60) may also assist in circulating water through the recirculating passageway 60 and into the reservoir 20. Furthermore, motive force for circulating water back to the reservoir 20 may be provided by a vacuum formed in the power generation system 10. At least the reservoir 20 and the recirculating passageway 60 may form a sealed, closed-loop system, and therefore a vacuum may form in the power generation system 10 when fluid is recirculating through the system. The vacuum may assist in forcing water to flow through the power generation system 10. Since these motive forces assist in continuously circulating water back to the reservoir 20, the amount of work (and electrical power) required to pump water via the pump 63 through the recirculating passageway 60 into the reservoir 20 may be reduced.

Since fluid seeks its own level, water may naturally rise upward in the recirculating passageway 60 from the first end 61 toward the liquid surface 24 in the reservoir 20. The additional motive force to push the fluid past the vertical level in the recirculating passageway 60 that corresponds to the vertical level of the liquid surface 24 in the reservoir 20 and through the inlet 27b in the reservoir 20 located above the liquid surface 24 may be provided by, e.g., the energy generating device 40b associated with the recirculating passageway 60, which generates power to power the pump 63 as water continuously circulates through the recirculating passageway 60.

As water continuously circulates through the recirculating passageway 60, the energy generating device 40b associated with the recirculating passageway 60 may convert energy from the continuously circulating flow of water in the recirculating passageway 60 to electrical power, and the electrical power may be used to power the components of the power generation system 10, e.g., the pump 63, the pump connected to the refilling passageway 50, etc. As a result, the pump 63 and the other components of the power generation system 10 require less or no power from power sources other than the energy generating device 40b. This power may be supplied from power sources such as the energy generating device 40a in the discharge passageway 30; the power storage system 110; and/or the solar array 130, the wind turbine 140, or other renewable energy power source. Therefore, the power generation system 10 may be operated using less or no power from external power sources, such as the electric grid 120, thereby reducing the dependence on receiving power from the electric grid 120.

The power generation system 10 may also include a heating mechanism 94 that may heat fluid in the recirculating passageway 60 or other passageways in the power generation system 10. The fluid may be heated to increase its flow rate. The heating mechanism 94 may be configured to heat fluid upstream or downstream of the pump 63 in the recirculating passageway 60. For example, the fluid may be heated by providing thermal solar power to a heat exchanger surrounding or otherwise connected to at least a portion of the recirculating passageway 60 or other passageway, directing solar power (e.g., using a reflector, solar concentrator, etc.) on or into the recirculating passageway 60 or other passageway, using waste, excess, or other heat from a generator, resistance heater, or compressor (e.g., the fuel-based generator 150, the compressor 83, etc.), using high or low temperature nuclear power (e.g., from the electric grid 120), etc. The heating mechanism 94 may include a radiator configured to receive fluid heated by the solar array 130, and the radiator may include, e.g., one or more channels in or near a wall of the recirculating passageway 60 or other passageway. The heated fluid may be used to drive steam turbines, Sterling engines, or other power systems connected to generators for producing power, or the heat could be stored for later use. In another embodiment, excess heat from the fuel-based generators may be used to power other generators that produce power, or the excess heat may also be stored in salt storage or insulated structures, or stored by other methods.

The power generation system 10 may include a fluid treatment system 64. For example, the fluid treatment system 64 may include a water aeration system, a water filtering system, a water purification system, and/or other type of electrical and/or mechanical system for treating or changing the content or quality of water or other fluid passing therethrough. The fluid treatment system 64 may be located in the recirculating passageway 60 near the inlets 27b, 27c of the reservoir 20 and/or the second ends 62 of the recirculating passageway 60, as shown in FIGS. 1 and 2. Also, as shown in FIGS. 1 and 2, multiple fluid treatment systems 64 may be provided in each second end 62 of the recirculating passageway 60, and the fluid treatment systems 64 may be located outside the reservoir 20 so that the fluid treatment systems 64 may be accessed, e.g., to replace parts, such as filters, or for other maintenance. Alternatively, the fluid treatment system 64 may be located near the first end 61 or in other locations along the length of the recirculating passageway 60, in the reservoir 20, or other passageways of the power generation system 10.

Periodic recirculation of water through the recirculating passageway 60 may prevent water from becoming stagnant in the water tower or power generation system 10 due to periods of time without moving water. Also, when water does not move for long periods of time, water quality may deteriorate from lack of oxygen, absorption of materials from the inside surface of the reservoir 20 and passageways of the water tower or power generation system 10, etc. When the fluid treatment system 64 is located in the recirculating passageway 60, the fluid treatment system 64 may treat and improve the quality of water recirculating into the reservoir 20. Therefore, since water circulating through the recirculating passageway 60 may be directed through the fluid treatment system 64, operation of the pump 63 to pump water through the recirculating passageway 60 may improve the quality of water in the water tower and power generation system 10.

The power generation system 10 may include an arm 70 formed by a pipe, a tube, or other type of conduit. The arm 70 includes a first end 71 connected to one of the inlets 27b, 27c in the reservoir 20. For example, in the exemplary embodiment shown in FIGS. 1 and 2, the first end 71 of the arm 70 connects to the inlet 27b. Alternatively, the first end 71 of the arm 70 may connect to the inlet 27c or any other inlets supplying water to the reservoir 20. As another alternative, multiple arms 70 may be provided and may include first ends 71 that connect to corresponding inlets in the reservoir 20.

The arm 70 extends into the reservoir 20 and includes a second end 72 that is a free end located inside the reservoir 20. The arm 70 may be located at a fixed position inside the reservoir 20 or may be moveable inside the reservoir 20 so that the second end 72 is also moveable inside the reservoir 20. For example, the arm 70 may be connected to the reservoir 20 using a hinge (not shown) or other device that allows the arm 70 to rotate, pivot, or otherwise move with respect to the reservoir 20 while maintaining a fluid connection between the arm 70 and the recirculating passageway 60. The arm 70 may be connected to a float mechanism (not shown) or other device that causes the arm 70 to move inside the reservoir 20, e.g., to follow the liquid surface 24 as water is discharged and refilled in the reservoir 20. Alternatively, the control system 100 may transmit signals to a device (not shown) that controls the pivoting or other type of movement of the arm 70 inside the reservoir 20.

The arm 70 includes one or more discharge valves 92 disposed in fluid communication with the recirculating passageway 60 via a passageway inside the arm 70. In the embodiment shown in FIGS. 1 and 2, the arm 70 includes one valve 92. Alternatively, the arm 70 may include multiple valves 92 positioned at different locations along a longitudinal axis of the arm 70. In the exemplary embodiment shown in FIGS. 1 and 2, the arm 70 is capable of pivoting around the connection between the arm 70 and the reservoir 20, e.g., due to a floating mechanism, so that at least the valve 92 is located above the vertical level of the liquid surface 24 as the liquid surface 24 rises and falls.

The valve 92 may be connected electrically by a connecting line 102 to the control system 100, and the control system 100 may transmit signals to the valve 92 to control the flow of fluid through the valve 92, such as when to open or close the valve 92, the degree to which the valve 92 is opened, etc., which may control the flow rate and/or pressure of the fluid output through the valve 92 into the reservoir 20. Controlling the valve 92 in the arm 70 may control the flow of water output from the recirculating passageway 60 and the arm 70 into the reservoir 20. One or more of the inlets 27a, 27b, 27c, 27d, which may or may not be connected to the arm 70, may also include valves 92 for controlling the flow of fluid injected into the reservoir 20 from the refilling passageway 50, the recirculating passageway 60, the compressed air passageway 80, etc., through the respective inlets 27a, 27b, 27c, 27d. Another valve may be included at or near the outlet 26, to prevent backflow of fluid into the reservoir 20 from the discharge passageway 30 and to control the flow of fluid discharged from the reservoir 20. Another valve may be included at or near the connection between the discharge passageway 30 and the recirculating passageway 60 to prevent backflow of fluid into the discharge passageway 30 from the recirculating passageway 60 and to control the flow of fluid to the pump 63.

The valve 92 is any type of suitable valve known to those skilled in the art. The valve 92 may be a one-way valve configured to allow water to be discharged into the reservoir 20 without allowing a backflow of water. One or more pressure relief valves may also be included to relieve pressure at one or more points in the power generation system 10.

The power generation system 10 may include more than one valve 92. For example, as an alternative, multiple valves 92 may be regularly spaced along the longitudinal axis of the arm 70 so that water may be discharged from the arm 70 at any vertical level at which any of the valves 92 can be positioned. As another alternative, multiple valves 92 may be regularly spaced along a vertical direction on the side surface 22 of the reservoir 20 and connected to a corresponding number of second ends 62 of the recirculating passageway 60. Recirculated water may be discharged from the recirculating passageway 60 at any vertical level at which any of the valves 92 are positioned in the side surface 22.

The compressed air passageway 80 may connect to the inlet 27*d* of the reservoir 20 to supply compressed air or other gas to the reservoir 20. The inlet 27*d* may be located in an upper portion of the reservoir, e.g., the top surface 23 of the reservoir 20 or an upper portion of the side surface 22 of the reservoir 20, so that the compressed air is injected into the reservoir 20 above the liquid surface 24. The compressed air passageway 80 may include a first end 81 that receives compressed air from an outside source (e.g., using a compressor 83), and a second end 82 that connects to the inlet 27*d* of the reservoir 20. Alternatively, the compressor 83 may compress another gas or a liquid to be supplied to the reservoir 20 via the compressed air passageway 80.

Adding compressed air to the reservoir 20 may increase the pressure in the reservoir 20, thereby increasing the pressure of the water discharged from the reservoir 20 and received by the energy generating devices 40*a*, 40*b*. As a result, the flow of water in the power generation system 10 may be controlled/accelerated, thereby controlling/increasing the rotation of the turbines 42 and controlling the power to be generated by the energy generating devices 40*a*, 40*b*.

One or more energy generating devices, such as the energy generating devices 40*a*, 40*b* described above, may be provided in other locations in the power generation system 10 in order to produce mechanical and/or electrical energy from the flow of water in the corresponding locations in the power generation system 10. For example, an energy generating device may be included in the arm 70 (e.g., at the first end 71, the second end 72, or other locations along the length of the arm 70, near the valves 92, etc.) and/or in the compressed air passageway 80 (e.g., at the first end 81, the second end 82, or other locations along the length of the compressed air passageway 80). Additional energy generation devices may be provided in or near the various valves 92, the inlets 27*a*, 27*b*, 27*c*, 27*d*, and/or other openings in the power generation system 10 in order to generate mechanical and/or electrical power from the fluids flowing through the various valves 92, inlets 27*a*, 27*b*, 27*c*, 27*d*, and/or other passageways or openings.

The power generation system 10 may include one or more sensors 90 for monitoring various characteristics of the power generation system 10, and the sensors 90 may be connected to the control system 100 by the connecting lines 102. The sensors 90 may be located at various locations in the power generation system 10, e.g., in or near the reservoir 20 (e.g., at or near the valves 92, spaced at regular intervals on the side surface 22 in the vertical direction above and/or below the liquid surface 24, at or near the outlet 26, at or near the inlets 27*a*, 27*b*, 27*c*, 27*d*, etc.), in or near the discharge passageway 30, the energy generating devices 40*a*, 40*b*, the refilling passageway 50, the recirculating passageway 60, the arm 70, the compressed air passageway 80, etc. For example, the sensors 90 may provide a monitored characteristics signal indicating one or more of the monitored characteristics, and may transmit the monitored characteristics signal to the control system 100. For example, the monitored characteristics may include, e.g., a pressure or flow rate of fluid (gaseous or liquid) in the power generation system 10, the location of the liquid surface 24 in the reservoir 20, etc., or may include other monitored characteristics that may allow the control system 100 to determine the pressure or flow rate of fluid in the power generation system 10, the location of the liquid surface 24 in the reservoir 20, etc., as is known to one of ordinary skill in the art. Other characteristics associated with the power generation system 10 may be monitored by the sensors 90 and/or determined by the control system 100 based on signals from the sensors 90 as would be apparent to one skilled in the art.

As described above, a float mechanism may cause the arm 70 to move to a position in which at least one valve 92 is located above the liquid surface 24. As a result, although the height of the liquid surface 24 may change as water is discharged from and refilled into the reservoir 20, the arm 70 may move so that the valve 92 in the arm 70 is located above the liquid surface 24. The control system 100 may then open the valve 92 to allow fluid to flow from the recirculating passageway 60 through the valve 92 to refill the reservoir 20.

Alternatively, e.g., if the arm 70 is not moveable inside the reservoir 20 or not included in the power generation system 10, the control system 100 may determine which of a plurality of valves 92 (e.g., valves 92 located near the inlets 27*b*, 27*c* on the side surface 22 of the reservoir 20, along the arm 70, etc.) are located above the liquid surface 24 and/or which valves 92 are located below the liquid surface 24. The control system 100 may determine which one of the valves 92 is located above the liquid surface 24 and is the closest to the liquid surface 24. The control system 100 may then open the selected valve 92 to cause fluid to flow from the recirculating passageway 60 through the selected valve 92 to refill the reservoir 20.

Water supplied to the reservoir 20 faces less resistance entering the reservoir 20 through an inlet or valve 92 located closest to the liquid surface rather than higher up. The flow of water faces less resistance when it is not forced to rise to higher elevations. Less power may be required to pump water through the recirculating passageway 60 when water does not have to travel as high vertically to enter the reservoir 20. Also, there is less resistance when the flow of water enters the reservoir 20 above the liquid surface 24 rather than below the liquid surface 24. Therefore, less power may be required to pump water through the recirculating passageway 60 when water is supplied into the reservoir 20 through an inlet or valve 92 located closest to the liquid surface 24 (rather than higher up) and above the liquid surface 24 (rather than below it). Accordingly, as described above, the control system 100 may be programmed to automatically determine which of the valves 92 is located above the liquid surface 24 and closest to the liquid surface 24.

As the liquid surface 24 rises and falls, the sensors 90 and/or the control system 100 may track the location of the liquid surface 24. The arm 70 may be pivoted about its connection to the reservoir 20 to position the valve 92 above and close to the liquid surface 24, as shown in FIGS. 1 and 2. The arm 70 may include any flexible or otherwise moveable connection to the reservoir 20 that allows the arm 70 to move at least vertically with the changing water level. As a result, the arm 70 may be continuously repositioned so that water may be discharged from the valve 92 located above and closest to the liquid surface 24 so that less power is used to pump water back into the reservoir 20.

Also, the sensors 90 may sense a characteristic of water or other fluid in the power generation system 10. For example, the sensors 90 may detect water quality, such an amount of certain elements or materials (e.g., oxygen) in the water in the power generation system 10. The sensors 90 may transmit a signal indicating the sensed water quality characteristic to the control system 100 via connecting lines 102. In response, the control system 100 may control the pump 63 and/or other components of the power generation system 10 based on the sensed water quality characteristic and/or other factors, e.g., power purchase rates, time schedules, etc. For example, the control system 100 may control when and for how long to operate the pump 63 to control the recirculation of water through the recirculating passageway 60 and to maintain certain water quality levels. The control system 100 may determine to operate the pump 63, e.g., when a sensed amount of oxygen is below a predetermined level, a sensed amount of other materials is above or below a predetermined level, and/or when purchase rates for providing renewable power, grid power, or other types of power to the pump 63 at the particular time of day are lower.

The control system 100 is also capable of controlling power storage, transfer, and generation in the power generation system 10. The power storage system 110, a connection to the electric grid 120, one or more of the solar arrays 130, one or more of the wind turbines 140, and one or more of the fuel-based generators 150 may be connected by the connecting lines 102 to the control system 100.

The power storage system 110 may include one or more flywheels, batteries, e.g., lithium-ion batteries, lead-acid batteries (e.g., absorbed glass mat (AGM) batteries, salt storage, etc.), or other devices configured to store and/or provide power known to those skilled in the art.

The power generation system 10 may connect to the electric grid 120 to receive power from the electric grid 120 and/or to provide power to the electric grid 120.

The solar array 130 is configured to convert light from the sun to electrical power. The solar array 130 may include one or more sub-arrays, and each sub-array may include one or more linked solar panels. The solar array 130 may be any type of suitable solar array known to those skilled in the art.

The wind turbine 140 is configured to convert kinetic energy from wind into mechanical and/or electrical power. The wind turbine 140 may be any type of suitable wind turbine known to those skilled in the art.

The fuel-based generator 150 may include, e.g., fuel cells, a natural gas driven generator, oil driven generator, propane driven generator, diesel fuel driven generator, gasoline driven generator, or other generator known to those skilled in the art. The fuel-based generator 150 may be connected to a fuel tank, e.g., an expandable pillow-style or bladder fuel tank.

The power storage system 110, the connection to the electric grid 120, the solar array 130, the wind turbine 140, and the fuel-based generator 150 may be provided at or below ground level or may be attached to the water tower, the power generation system 10, or other supporting device to elevate one or more of these components. For example, as shown in FIGS. 1 and 2, several of the components, such as the solar arrays 130 and wind turbines 140 may be attached to the outer surface of the reservoir 20.

The power storage system 110, the connection to the electric grid 120, the solar arrays 130, the wind turbines 140, the fuel-based generators 150, and other components of the power generation system 10, such as the energy generating devices 40*a*, 40*b* (e.g., the generators 41), the pump 63, the compressor 83, the sensors 90, and the valves 92, are connected to the control system 100 by the connecting lines 102. The control system 100 may transfer mechanical and/or electrical power to and from the various components. The control system 100 is capable of managing and dispatching power from these components in real time, thereby providing a more efficient system.

As described above, the control system 10 may determine where the liquid surface 24 is located and may automatically select which valve 92 is located above and closest to the liquid surface 20. Then, the control system 10 may open the selected valve 92 to direct water back into the reservoir 20. When the valve 92 for directing water from the recirculating passageway 60 to the reservoir 20 is close to and above the top of the liquid surface 24 in the reservoir 20, less power may be required to pump water into the reservoir 20 through the recirculating passageway 60 and to continue the cycle of water flow. This smaller amount of power to pump water may be provided by one or more power sources, such as the renewable energy sources (e.g., the solar array 130, the wind turbine 140, a microhydro system, etc.), the power storage system 110 (e.g., batteries, flywheels, etc.), the electric grid 120, or other power sources. The particular power source to be used, e.g., to power the pump 63, the compressor 83, or other component of the power generation system 10, may be selected automatically using the control system 100 based on which is the most cost-effective power source. The control system 100 may also determine when and for how long to operate the pump 63, the compressor 83, and other components of the power generation system 10 to maintain a cost-effective system.

Power for the power generation system 10 may also be added from the power storage system 110, the solar arrays 130, the wind turbines 140, the generator 150, or other renewable or other types of power sources on or off the electric grid 120. As a result, power may be generated by sources other than the energy generating devices 40*a*, 40*b*, e.g., when the turbines 42 in the discharge passageway 30 and the recirculating passageway 60 are not in operation because water is not exiting the reservoir 20.

Generating power using renewable energy devices, such as the solar arrays 130 and/or the wind turbines 140, may lower operating costs for pumping water compared to using power from the electric grid 120. Thus, the control system 100 may determine when adequate power is being generated by these renewable energy devices and the energy generating devices 40*a*, 40*b* in the power generation system 10, and may draw power from the electric grid 120 to operate the pump 63 and other system controls when the power generated from the renewable energy devices and the energy generating devices 40*a*, 40*b* is inadequate or below a predetermined amount or rate.

Power may be generated by the power generation system 10 (e.g., using the energy generating devices 40*a*, 40*b*, the solar arrays 130, the wind turbines 140, etc.) to operate the pump 63, the compressor 83, or any other components of the power generation system 10. Any excess power may be stored in the power storage system 110 for later use. Alternatively, excess power may be sold and transmitted to the electric grid 120. The control system 100 may determine whether to store or sell the excess power based on stored parameters, such as a time schedule, power purchase rates, etc. For example, if excess power is available during the day or at other times when power purchase rates are higher, the control system 100 may determine to sell, rather than store, the excess power. Other parameters may also be stored in the control system 100 to make this determination. Also, if the power storage system 110 reaches a predetermined limit, e.g., capacity, the excess power may be redirected, e.g., to the pump 63, to pump water to the reservoir 20 or to pump gases into the reservoir 20 to pressurize it (if needed), and/or sold and transmitted to the electric grid 120. This may be particularly profitable if the excess power is available to be transmitted to the electric grid 120 at peak times during the day so that the power may be sold at higher rates.

The control system 100 may also use stored parameters, such as a time schedule, power purchase rates, a characteristic of the power storage system 110 (e.g., a storage capacity of the power storage system 110), etc., to determine when to purchase power from the electric grid 120. For example, in the day or at other times when power purchase rates are higher, if the energy generating devices 40a, 40b and renewable energy sources (e.g., the solar array 130, the wind turbine, etc.) are not producing adequate power (e.g., a predetermined rate or amount), the control system 100 may determine to use power from the power storage system 110 or the generator 150 rather than purchase power from the electric grid 120. Alternatively, at night or at other times when power purchase rates are lower, if the energy generating devices 40a, 40b and renewable energy sources are not producing adequate power, the control system 100 may determine to purchase power from the grid 120 rather than use power from the power storage system 110 or the generator 150.

As a result, the power generation system 10 may also reduce costs for storing electric power. When the power storage system 110 is filled to capacity, excess power generated by the power generation system 10, e.g., by the solar arrays 130 and/or wind turbines 140, may be captured, not wasted, and sold to the electric grid 120. This may avoid requiring more expensive power storage systems 110, and providing power to the electric grid 120 may reduce the need for providing expensive high-voltage long-distance power lines from wind or solar farms to consumers.

The control system 100 may continuously monitor and/or store various parameters, such as the power generated and power used by the various components of the power generation system 10, the power stored and storage capacity of the power storage system 110, an amount (estimated or actual) of power needed, the location of the liquid surface 24 in the reservoir 20, time of day or other time schedules, power purchase rates for the electric grid 20, and other parameters affecting power supply, power quality, and demand to optimize power generation and dispatch in the power generation system 10, e.g., to determine which power source to supply power to the pump 63, the compressor 83, and/or other components of the power generation system 10, to determine whether to store power in the power storage system 110, to determine whether to buy power from or sell power to the electric grid 120, etc. Generating and/or storing power may be timed so that power is sold to the electric grid 120 at times of peak demand to obtain higher prices. This would help to satisfy peak power needs and add to the efficiency of the electric grid 120. As more power comes into the electric grid 120 from larger solar and wind farms, great power fluctuations may occur as clouds pass by and wind varies. Typically, some large, conventional, fuel-based power plants must continue to be operated on spinning reserve to produce power to cover such fluctuations. The power generation system 10 may provide such reserve power at less expense and with less fuel and fewer environmental impacts. Also, providing higher prices during peak periods may send more transparent market signals to improve the efficiency of the electric grid 120.

The control system 100 may determine when to refill the reservoir 20 (e.g., using the refilling passageway 50, the recirculating passageway 60, the arm 70, the compressed air passageway 80, etc.) based on the monitored and/or stored parameters listed above. For example, the control system 100 may determine when and for how long to open the valves 92 that permit fluid to enter the reservoir 20 through the refilling passageway 50, the recirculating passageway 60, the arm 70, the compressed air passageway 80, etc., based on the monitored and/or stored parameters listed above.

The power generation system 10 may also include, e.g., a fan, heat sink, or other passive and/or electrical and/or mechanical heat and power discharge system. Excess power may be discharged by operating this heat and power discharge system, such as when the batteries and other storage systems are at capacity. For example, excess power from the wind turbine 140 may be converted to heat using an electrical resistance coil or "burn off" heater or other device. This excess heat may be discharged to the atmosphere or captured and used alone or with other heat sources in the power generation system 10 to drive a turbine to generate more power.

The power generation system 10 provides more efficient power storage and is capable of producing power in multiple ways. The power generation system 10 is a sealed, closed-loop system that allows water to be continually circulated from the bottom of the reservoir 20 to an upper portion of the reservoir 20. Water may be directed through the power generation system 10 by aid of gravity, momentum, and/or a vacuum effect, and power may be generated from the water flow using the energy generating devices 40a, 40b. The energy generating devices 40a, 40b may provide power to the power generation system 10 (e.g., to the pump 63, the compressor 83, etc.) using renewable energy sources. Water discharged from the reservoir 20 and/or the recirculating water may power the energy generating devices 40a, 40b to generate mechanical and/or electrical power.

As fluid continues to recirculate through the power generation system 10, e.g., through the reservoir 20 and the recirculating passageway 60, a vacuum pressure may build up within the power generation system 10, which aids the pump 63 in recirculating fluid through the power generation system 10. This added pressure may reduce the amount of power needed to drive the pump 6, a pump connected to the refilling passageway 50, and/or the compressor 83, and/or other components of the power generation system 10, and may also reduce the amount of power that would otherwise be drained from the power storage system 110, the electric grid 120, etc.

The power generation system 10 may also produce power from air flow. Renewable energy generation devices, such as the solar arrays 130 and/or wind turbines 140 may be used to power the compressor 83, which pumps compressed air into the reservoir 20 for storage. The compressed air may then be released upon demand and run through the energy generating devices 40a, 40b to produce power. The control system 100 may determine when and for how long to operate the compressor 83 to supply the compressed air to the reservoir 20. For example, the control system 100 may determine to operate the compressor 83 if the power generated from the energy generating devices 40a, 40b and/or the renewable energy sources is below a predetermined rate or amount.

The power generation system 10 may use less power from the electric grid 120, which in turn may reduce emissions. Power external to the power generation system 10 and supplied to the electric grid 120 may be generated from carbon-based coal, oil, natural gas, or other fossil fuel power plants. Such power production and its transmission and distribution may produce $CO_2$, $NO_x$, $SO_x$, mercury, and other environmentally harmful emissions. On the other hand, the power generation system 10 may use renewable energy, which eliminates or reduces those emissions. Using renewable energy in place of grid-based power, e.g., to pump water into the reservoir 20, improves the environment by reducing emissions of greenhouse and other gasses.

In power generation systems 10 that store water in the reservoir 20, water also may also be used to produce hydrogen using hydrolysis, and the hydrogen produced may be used to power a fuel cell or generator or engine.

The power generation system 10 operates using an improved method of storing and producing electricity using water towers. According to an exemplary embodiment, the power generation system 10 incorporates a water tower, such as a water tower found in municipal water systems. The power generation system 10 may pump water and increase the force of the water flow using the energy generating devices 40a, 40b. The power generation system 10 may be combined with renewable energy sources to power the system 10 and a smart, micro-grid interface.

The power generation system 10 may provide more efficient energy storage using water towers, reduce power requirements to refill water towers, use water towers to generate power, store and dispatch excess power that otherwise would be wasted (e.g., excess solar and/or wind power from solar and/or wind farms that otherwise would need large and expensive battery or other storage systems), and use an integrated power management system to control these subsystems and provide economic dispatch of clean power into the electric power grid.

Pumping water into municipal and other water towers typically requires substantial expense and often the price to use electricity from the electric grid to pump water into the water towers when needed is not low, such as during the day. However, with the power generation system 10, renewable energy may be generated in the day or night using solar arrays 130, wind turbines 140, etc. Also, other energy may be generated from the flow of fluid into and from the reservoir 20. As a result, pumping costs may be reduced.

FIGS. 1 and 2 show that the power generation system 10 may be incorporated into a single water tower. Alternatively, the power generation system 10 may be incorporated into a plurality of water towers. For example, a single control system 100 or multiple control systems 100 may connect to a plurality of reservoirs 20, which are each included in a different water tower.

Figure 3:
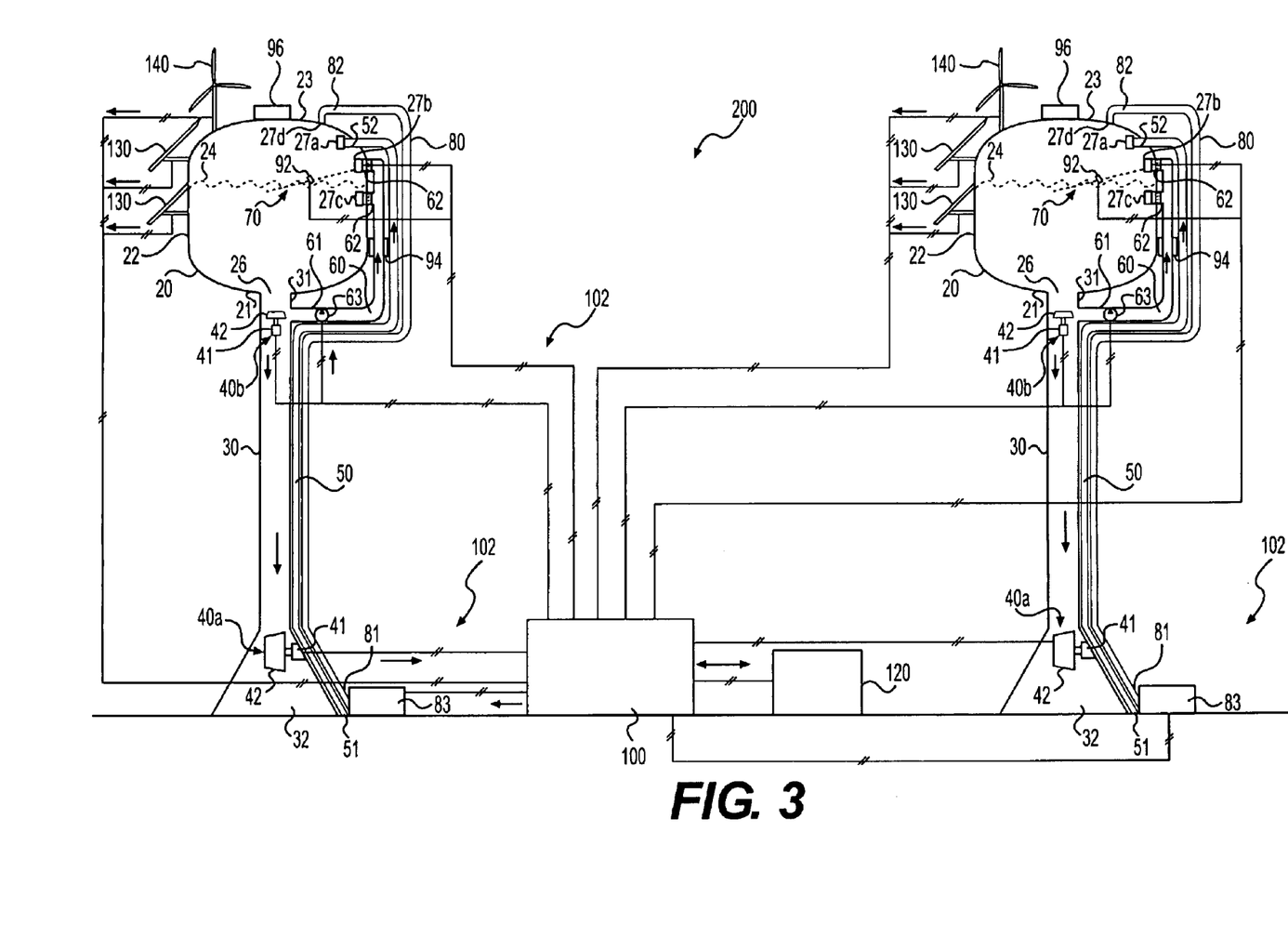
FIG. 3 is a perspective view of an exemplary disclosed plurality of water towers with a power storage and generation system.

As shown in FIG. 3, the power generation system 200 may be an integrated system for multiple water towers or reservoirs 20. The integrated system may include multiple sensors connected to the control system 100 to monitor and/or control power and fluid conditions in each reservoir 20, power demand at various locations on the grid, time of day rates, power availability from various sources, weather, and other conditions, to optimize the receipt, storage, and dispatch of water and/or power from each reservoir 20 within the total system, which may cover thousands of miles along the power grid.

In addition, in another embodiment, a real time (or other) display 96 on the water tower may be provided which could be viewed from persons passing by. This may encourage the more efficient use of power and help to reduce pollution by: continuously showing power information, such as power saved and power cost savings from the operation of the power generation system 10, reductions in carbon dioxide and other pollutants and contributors to global warming from the system, and other useful data.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A power generation system comprising:
    a reservoir configured to store fluid, the reservoir including a bottom surface and a plurality of inlets located at different vertical locations in the reservoir;
    a recirculating passageway fluidly connected to the reservoir, the recirculating passageway including a first end connected to and located near or below the bottom surface of the reservoir and a plurality of second ends connected to the plurality of inlets above the bottom surface of the reservoir;
    a fluid-driven energy generating device fluidly connected to the recirculating passageway, at least a portion of fluid directed through the energy generating device being directed through the recirculating passageway; and
    a pump located in the recirculating passageway.

2. The power generation system of claim 1, wherein the energy generating device is connected to the pump to supply power to the pump.

3. The power generation system of claim 1, further including a power storage system and a renewable energy device each connected to at least one of the energy generating device and the pump.

4. The power generation system of claim 1, further including a fluid discharge passageway fluidly connected to the reservoir, the discharge passageway including a first end connected to and located near or below the bottom surface of the reservoir and a second end located below the first end of the discharge passageway.

5. The power generation system of claim 1, further including a heating mechanism configured to heat fluid directed through the recirculating passageway.

6. The power generation system of claim 1, further including:
    a display viewable by persons passing the power generation system;
    wherein the display is configured to show reductions in pollutants or global warming from operation of the power generation system.

7. The power generation system of claim 1, further including:
    a sensor configured to sense a condition in the reservoir; and
    a control system configured to control a flow of fluid through a plurality of discharge valves at the plurality of inlets in the reservoir based on the sensed condition.

8. The power generation system of claim 1, further comprising:
    a compressed fluid passageway fluidly connected to a compressor and configured to direct compressed fluid from the compressor into the reservoir;
    wherein the fluid-driven energy generating device is located in at least one of the recirculating passageway, the compressed fluid passageway, or a passageway connected to an outlet of the reservoir.

9. The power generation system of claim 8, further including a control system configured to monitor a condition of the power generation system and configured to control the compressor based on the monitored condition, wherein the monitored condition includes power from the energy generating device.

10. The power generation system of claim 1, further comprising:
    a control system;
    a plurality of reservoirs including the reservoir configured to store fluid, the plurality of reservoirs being connected to the control system and an electric grid; and
    a plurality of sensors configured to monitor power and fluid conditions in each reservoir, wherein the control system is connected to the sensors and controls power and fluid conditions in each reservoir, wherein the power and fluid conditions that are controlled are determined by weather.

11. The power generation system of claim 1, further including a plurality of power sources configured to supply power to the power generation system, wherein the power sources include at least one of a solar, wind, hydroelectric, or other renewable energy source, a battery, or a fuel cell.

12. The power generation system of claim 1, further comprising an arm inside the reservoir and fluidly connected to the recirculating passageway, the arm including a discharge valve through which fluid is capable of being supplied to the reservoir.

13. The power generation system of claim 12, wherein the arm is moveable based on a vertical location of a liquid surface in the reservoir.

14. The power generation system of claim 12, wherein the arm includes multiple discharge valves at different locations along a longitudinal axis of the arm.

15. The power generation system of claim 1, further including:
a plurality of power sources configured to supply power to the pump, the plurality of power sources including the energy generating device; and
a control system configured to determine which of the power sources to supply power to the pump or whether to store power in a power storage system.

16. The power generation system of claim 15, wherein:
the plurality of power sources are connected to an electric grid; and
the control system is further configured to determine at least one of whether to direct power to or whether to receive power from the electric grid based on at least one of a time schedule, a power purchase rate, or a characteristic of the power storage system.

17. The power generation system of claim 15, wherein the power sources further include a renewable energy generating device including at least one of a solar array or a wind turbine attached to or placed near the power generation system.

18. The power generation system of claim 1, wherein the reservoir is included in a water tower.

19. A power generation system comprising:
a reservoir configured to store fluid, the reservoir including a bottom surface;
a recirculating passageway fluidly connected to the reservoir, the recirculating passageway including a first end connected to and located near or below the bottom surface of the reservoir and a second end connected to the reservoir above the bottom surface of the reservoir;
a fluid-driven energy generating device fluidly connected to the recirculating passageway, at least a portion of fluid directed through the energy generating device being directed through the recirculating passageway;
a pump located in the recirculating passageway;
a sensor configured to monitor water quality in the reservoir;
a control system configured to adjust a flow of fluid through the recirculating passageway based on the sensed water quality; and
a fluid treatment device located in the recirculating passageway, wherein the fluid treatment device includes at least one of a water aeration system, a water filtering system, or a water purification system.

20. A power generation system comprising:
a control system;
a plurality of reservoirs located at different geographic locations, the plurality of reservoirs including a first reservoir configured to store fluid, the first reservoir including a bottom surface, the plurality of reservoirs being connected to the control system and an electric grid;
a recirculating passageway fluidly connected to the first reservoir, the recirculating passageway including a first end connected to and located near or below the bottom surface of the first reservoir and a second end connected to the first reservoir above the bottom surface of the first reservoir;
a fluid-driven energy generating device fluidly connected to the recirculating passageway, at least a portion of fluid directed through the energy generating device being directed through the recirculating passageway;
a pump located in the recirculating passageway; and
a plurality of sensors configured to monitor a power condition associated with each reservoir,
wherein the control system is connected to the plurality of sensors and is configured to:
determine a price of at least one of power sold to the electric grid or power purchased from the electric grid, and
determine whether to purchase power from the electric grid, sell power to the electric grid, or use power from the power generation system based on the determined price and the monitored power conditions.

* * * * *